Mar. 3, 1925.
L. VERHAERT
PROCESS FOR THE MANUFACTURE OF ELECTRICAL RESISTANCES
Filed Dec. 6, 1923
1,528,711
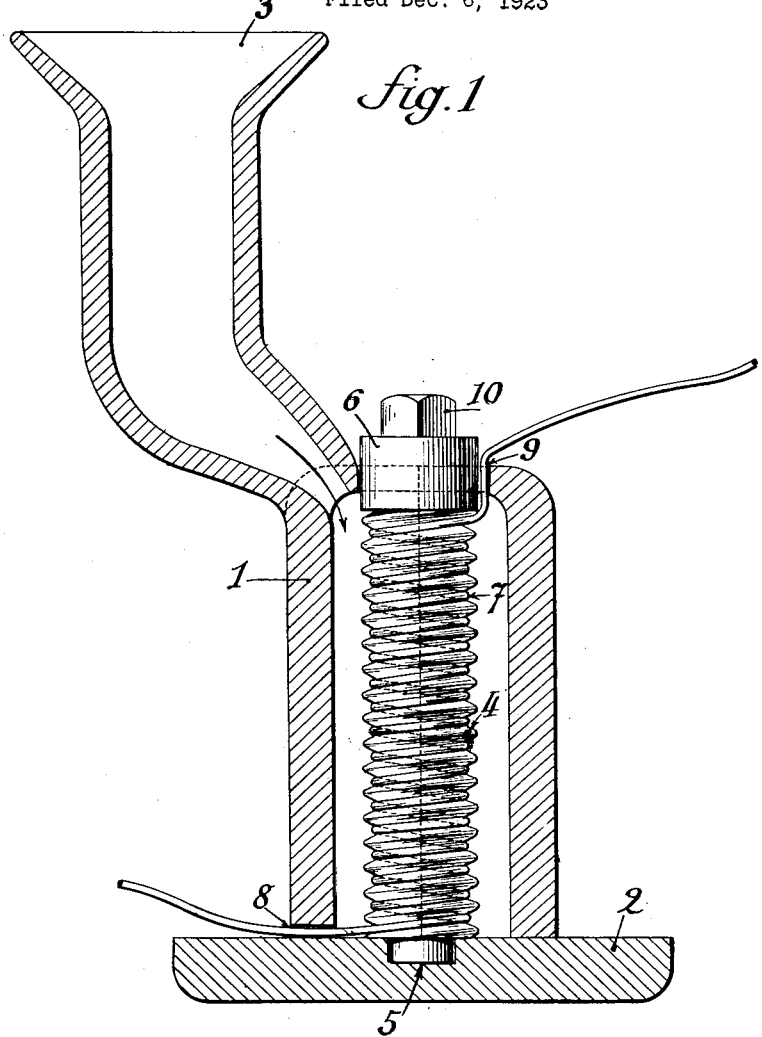
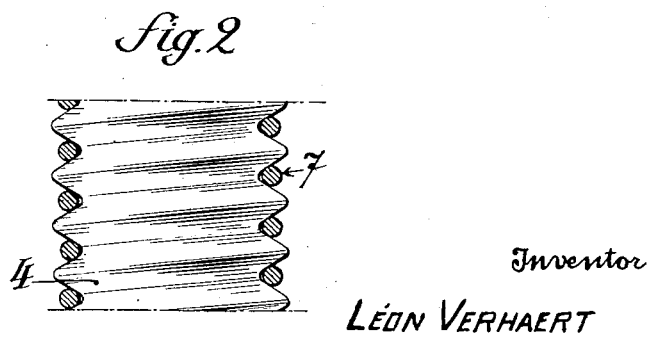
Inventor
LÉON VERHAERT Patented Mar. 3, 1925.

1,528,711

UNITED STATES PATENT OFFICE.

LÉON VERHAERT, OF PARIS, FRANCE.

PROCESS FOR THE MANUFACTURE OF ELECTRICAL RESISTANCES.

Application filed December 6, 1923. Serial No. 678,976.

*To all whom it may concern:*

Be it known that I, Léon Verhaert, a citizen of the Republic of France, and residing at Paris, Seine Department, No. 5 Quai Aux Fleurs, in the Republic of France, have invented certain new and useful Processes for the Manufacture of Electrical Resistances, of which the following is a specification.

The present invention has for object a process for the manufacture of insulated resistance comprising a helically wound leading in wire embedded within an insulating mass of glass, crystal or similar vitreous matter.

This process consists in winding the resistance about the threads of a screw which is then placed in a mould into which the molten vitreous matter is then introduced; at the moment of tapping, the resistance wire gets instantaneously heated and welds itself to the glass, while the steel screw which is of a different material, preferably steel does not get sufficiently hot to be instantaneously welded, which permits the removal of the same by unscrewing after a few instants; the operation is terminated by immediately casting glass into the cavity or recess left by this screw. The leading in wire or conductor is thus entirely embedded into a block of glass except at its ends which have been carefully protected and project outside the mould.

If the nature of the glass has been particularly selected, the same will be thoroughly soldered to the wire but will however, without breaking, follow the expansions and contractions of same.

The accompanying drawing shows by way of example, a device used for carrying out the process according to the invention.

Fig. 1 is a vertical section of a mould showing therein the arrangement of the screw and resistance wire wound thereon.

Fig. 2 is an enlarged fragmentary side view of the steel screw, showing in section the insulating wire wound thereon.

1 denotes the body of the mould which is divided into two parts in a vertical plane and 2 is the lower closing plug.

A filling hopper 3 is formed at the upper part.

A screw 4 is adapted to be introduced into the mould and has its lower end engaged with a centering recess 5 provided in the base 2, this screw having a smooth part 6 guided in the upper part of the mould.

The conducting wire 7 having the required resistance is wound about the threads of the screw 4, as shown in Fig. 2.

The ends 8 and 9 of this wire are placed, as indicated in Fig. 1, on the one hand between the body 1 and the base 2, and on the other hand between the screw 4 and the upper part of the mould. In this manner these ends are kept clear from the vitreous matter while casting.

After the mould has been filled with the molten glass, a pressure is preferably exerted into the hopper 3 so as to insure a homogeneate mass; then after a few seconds, the screw 4 is removed by unscrewing; this screw carries for this purpose a head 10 of square or hexagonal shape. By this time, the tapped off mass is sufficiently consistent so as not to sink towards the center of the mould and the coils of the wire remain well maintained in position. Glass is then cast or run into the free space left in order to constitute a solid insulating cylinder in which the resistance wires are embedded. The removal from the mould will finally be effected in the usual manner. It will be possible to use as an insulator any fusible material which will be liable to weld itself to the resistance wire and presenting a coefficient of expansion approaching as much as possible the one of this wire. On the other hand, the shape given to the insulating mass through moulding can be of any kind. The screw can be made in any suitable material provided the same does not tend to weld itself to the molten matter too suddenly; if necessary, the same can be cooled through a circulation of water or otherwise. It will also be possible to give to the screw a slightly conical or tapered shape in order to facilitate the unscrewing operation.

Claims:

1. A process for the manufacture of electrical resistances comprising a conducting wire which is helically wound and is embedded in a fusible insulating material and which consists of placing the wire in the threads of a screw, introducing the screw with the wire into a mould, casting insulating material into the mould, removing the screw by unscrewing, and casting insulating material into the recess left by the screw.

2. A process for the manufacture of electrical resistances comprising a conducting wire which is helically wound and is embedded in a fusible insulating material and which consists of placing the wire in the threads of a screw, introducing the screw with the wire into a mould, casting insulating material into the mould, exerting upon the insulating material contained in the mould a pressure which causes the same to thoroughly enter the threads of the screw, removing the screw by unscrewing, and casting again insulating material into the recess left by the screw.

In testimony that I claim the foregoing as my invention, I have signed my name in presence of two subscribing witnesses.

LÉON VERHAERT.

Witnesses:
 CAMILLE BLÉTRY,
 MAURICE ROUX.